(12) United States Patent
Vaidyanathan et al.

(10) Patent No.: US 6,367,068 B1
(45) Date of Patent: Apr. 2, 2002

(54) DYNAMIC PARSING (75) Inventors: Shankar Vaidyanathan, Bellevue; Philip Lucido, Redmond; Sundeep Bhatia, Bellevue, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/191,499

(22) Filed: Nov. 13, 1998

(51) Int. Cl.$^7$ ................................................. G06F 9/44
(52) U.S. Cl. ............................... 717/8; 717/2; 717/4
(58) Field of Search ....................... 717/1, 2, 4–8; 714/57, 48, 38, 811; 707/3, 4, 530–534; 345/358, 333; 704/9

(56) References Cited

U.S. PATENT DOCUMENTS

| | | | | |
|---|---|---|---|---|
| 4,931,928 A | * | 6/1990 | Greenfeld | 717/8 |
| 5,577,241 A | * | 11/1996 | Spencer | 707/5 |
| 5,649,222 A | * | 7/1997 | Mogilevsky | 707/533 |
| 5,671,403 A | * | 9/1997 | Shekita et al. | 707/3 |
| 5,673,390 A | * | 9/1997 | Mueller | 714/57 |
| 5,694,603 A | * | 12/1997 | Reiffin | 709/107 |
| 5,813,019 A | * | 9/1998 | Vanter | 707/512 |
| 5,905,892 A | * | 5/1999 | Nielsen et al. | 717/5 |
| 6,012,075 A | * | 1/2000 | Fein et al. | 707/540 |
| 6,061,467 A | * | 1/2000 | Newsted et al. | 704/9 |
| 6,115,544 A | * | 9/2000 | Mueller | 395/185.1 |
| 6,163,879 A | * | 12/2000 | Mackey | 717/1 |
| 6,305,008 B1 | * | 10/2001 | Vaidyanathan et al. | 717/4 |

OTHER PUBLICATIONS

IBM Technical Disclosure Bulletin, "Automated Code Checker", vol. 36 No. 09B Sep. 1993, pp 239–240.*
IBM Technical Disclosure Bulletin, "Smalltalk Tokenizer and Backus–Naur Form Parser", vol. 37 No. 12, Dec. 1994, pp. 313316.*

* cited by examiner

Primary Examiner—Tuan Q. Dam
(74) Attorney, Agent, or Firm—Woodcock Washburn LLP (57) ABSTRACT

Dynamic parsing is disclosed. In one embodiment, a system includes an editor and a dynamic parser. The editor provides for developing of source code for a computer program. The dynamic parser parses the source code as the source is developed within the editor during predetermined times (for example, in one embodiment, every second).

31 Claims, 4 Drawing Sheets

DYNAMIC PARSING

RELATED APPLICATIONS

Coassigned, copending, and cofiled applications entitled "Indexing and Searching Across Multiple Sorted Arrays," Ser. No. 09/192,057, now U.S. Pat. No. 6,266,665, "Automatic Statement Completion" Ser. No. 09/191,781, now U.S. Pat. No. 6,305,088 and "Automated Help Information" Ser. No. 09/191,757, filed Nov. 13, 1998, are hereby incorporated by reference.

FIELD

This invention relates generally to parsing, and more particularly to dynamic (that is, real-time) parsing.

BACKGROUND

Computer programs have become increasingly more complex. As a result, whereas before a single programmer may have been responsible for developing a computer program, today frequently teams of programmers are responsible for developing a given program. The source code for such programs may exceed hundreds of pages in length. Thus, the programmers job is one that has become more increasingly more difficult.

As a result, a market for compilers—which are computer programs that turn source code of a program into an executable version that can actually be run on a computer—that make programming easier has proliferated. The compilers indicate the errors to the programmer when the files are saved and the build (compiling/linking) process is initiated. This makes the programmer's job very hard, in that he or she has to wait until compiling a program to learn that errors have been introduced into the source code. Once these errors are corrected compilers generate browse information which can be queried in software development environments. This browse information is an aid to further program development, but, is correct only up to the last compile. As new code is added this information is out of date and is not very useful in writing new code.

A downside of this explicit compiling is that it may be inconvenient for the programmer to have to initiate the build process him or herself. The compilation process in large complex programs takes a sufficiently large time that a programmer will not initiate it very often. Where the programmer specifies that the build process take place each time the source code is saved, this sort of compilation may nevertheless be inconvenient—the programmer may, for instance, have written significant source code prior to performing a save operation, such that when the errors are pointed out by this process, the programmer may not easily recall what source code the errors relate to, etc. Also the software development environment cannot provide much assistance with respect to new code being written since the last compile. For these and other reasons, there is a need for the present invention.

The above-identified problems, shortcomings and disadvantages with the prior art, as well as other problems, shortcoming and disadvantages, are solved by the present invention, which will be understood by reading and studying the specification and the drawings. In one embodiment, a system includes an editor and a dynamic parser. The editor provides for developing of source code for a computer program. The dynamic parser parses the source code as the source code is developed within the editor during predetermined times (for example, in one embodiment, every second or at the end of every statement or when the software development environment is inactive or idle e.g. when a programmer pauses to think). In one embodiment, the dynamic parser generates a file (or, database) known as a no-compile-browse (NCB) file (or, database), and a database engine to provide for querying of the NCB file (or, database). The dynamic parser can query the above database at any time and provide information in various ways to the benefit of the user and to aid in development of the program. The dynamic parser needs to be extremely tolerant of syntax and semantic errors in the user code because it can be operating with essentially incomplete/invalid code because it is not known in advance at what stage dynamic parsing will be activated. Thus, embodiments of the invention provide for advantages not found in the prior art. While a programmer is developing or writing source code for a program, in one embodiment the dynamic parser can parse the source code in the background, as the programmer is writing the code. The dynamic parser can thus in one embodiment find errors in the program, such that the editor can highlight these errors to the programmer (for example, by underlining the offending source code relating to the error).The dynamic parser can in another embodiment use the information in the NCB file/database to provide real time updated information about the program and provide other means to help the programmer as described later. In this manner, development of computer programs is made easier as compared to the prior art. Thus, parsing is accomplished in a real-time, not static, manner.

In one embodiment of the invention, the dynamic parsing is performed with respect to program development in the language C++. As those of ordinary skill within the art can appreciate, dynamic parsing in this context is much more difficult to perform than in languages such as BASIC and Pascal. Therefore, another advantage of the invention is that it is applicable to languages such as C++.

Other advantages of dynamic parsing include: the identification of errors and warnings in the code as the user types; the providing of a schematic description of the application or the program as the user types; and, the providing of auto-completion information, as described in more detail in the applications incorporated by reference. Besides the embodiments, advantages and aspects of the invention described here, the invention also includes other embodiments, advantages and aspects, as will become apparent by reading and studying the drawings and the following description.

By 'schematic description' we mean a graphical view of the NCB file/database. The graphical view shows various entities in a program, their properties and relationships to each other. This graphical view provides an outline of the program and allows the programmer to navigate from any part of the view to the actual source code that corresponds to that entity.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system of one embodiment of the invention is presented. In the third section, a method, in accordance with an embodiment of the invention, is provided. Finally, in the fourth section, a conclusion of the detailed description is provided.

Hardware and Operating Environment

Figure 1:
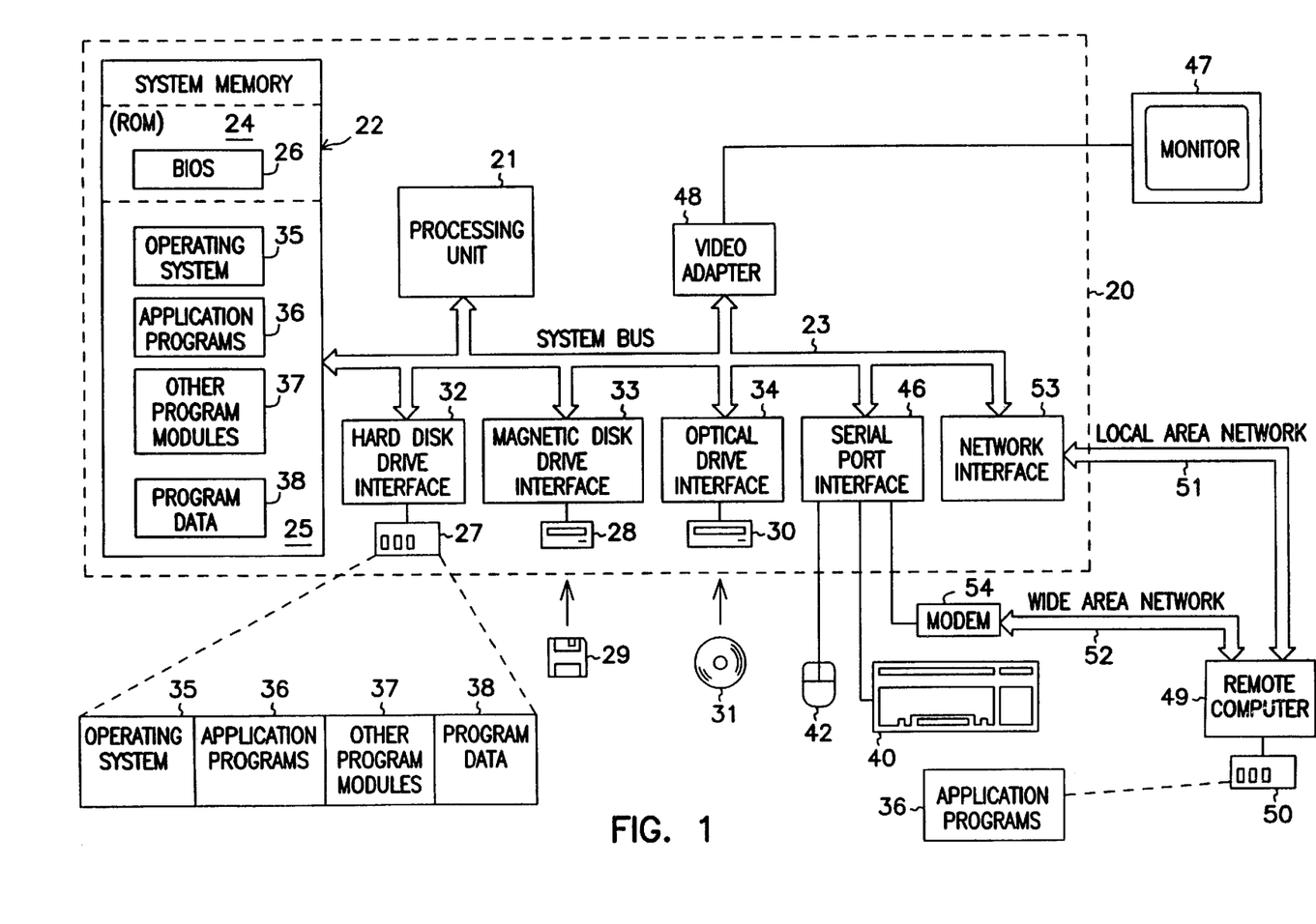
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System

Figure 2:
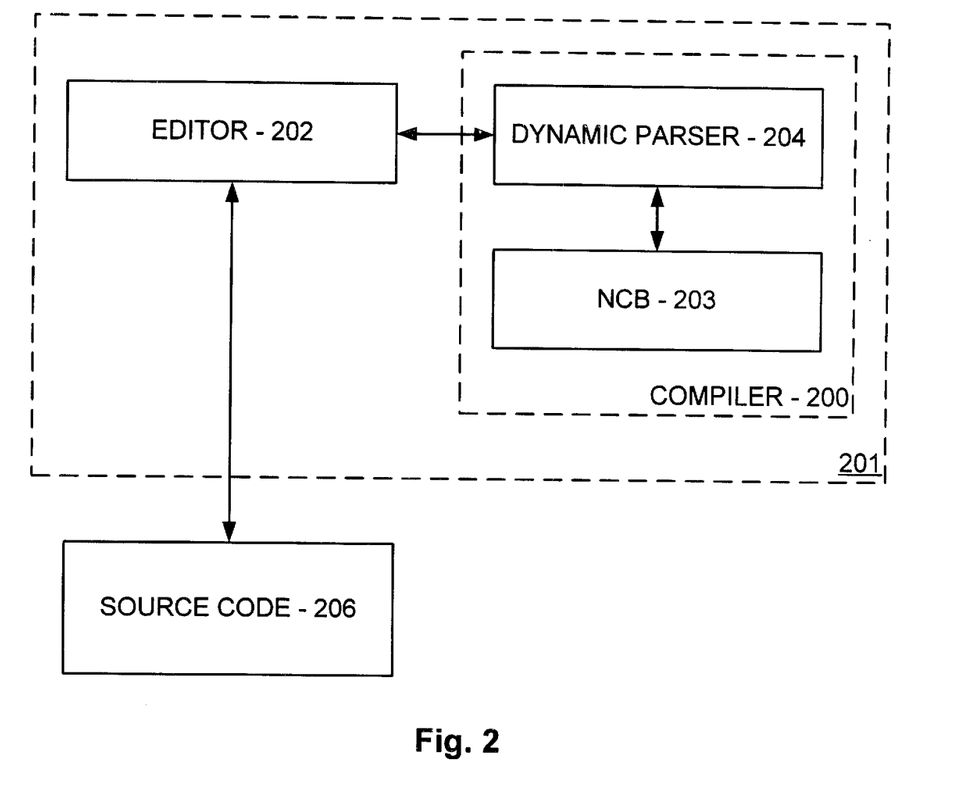
FIG. 2 shows a block diagram of a system according to one embodiment of the invention.

In this section of the detailed description, a description of a computerized system according to an embodiment of the invention is provided. The description is provided by reference to FIG. 2. Referring now to FIG. 2, a system according to an embodiment of the invention is shown. The system includes a compiler 200, and an editor 202. As shown, the compiler 200 includes a dynamic parser 204. Those of ordinary skill within the art will appreciate that the compiler 200 also may include other components, not shown in FIG. 2; only those parts necessary to describe the invention in an enabling manner are provided. The compiler 200 may be any type of compiler; the invention is not so limited. For example, the compiler 200 can in different embodiments be: a C compiler, a C++ compiler, a Pascal compiler, a Visual BASIC compiler, etc., all of which are known in the art.

The compiler 200 compiles source code 206 into executable code (not shown in FIG. 2). The source code 206 is a text description of a computer program, as written in a given programming language by or for one or more computer programmers. The executable code is that which is produced by the compiler 200, so that the computer program can actually be run on a computer (for example, a computer as has been described in the preceding section of the detailed description). The editor 202, which is part of the Integrated Development Environment 201, provides for the developing (writing) of the source code 206 of a computer program. The dynamic parser 204 parses the source code 206 as the source code is developed (written) within the editor 202 during predetermined times and stores the result of the parse in the NCB database/file 203. The Integrated Development Environment 201 includes the editor 202 and the compiler 200, and refers to the complete development environment in which a programmer develops code. The NCB database/file 203 is a database/file as is described later in this application.

Thus, in accordance with one embodiment of the invention, the system of FIG. 2 works as follows. A computer programmer uses an IDE and drafts the source code 206 within the editor 202. As the programmer is writing the source code 206, the dynamic parser 204 parses the source code 206 during predetermined times (through the IDE). For example, the dynamic parser 204 can in one embodiment parse the source code 206 at predetermined time-out periods, such as every half second or one second in which the programmer stops entry of source code into the editor 202. This is typically known as idle cycle.

Figure 3:
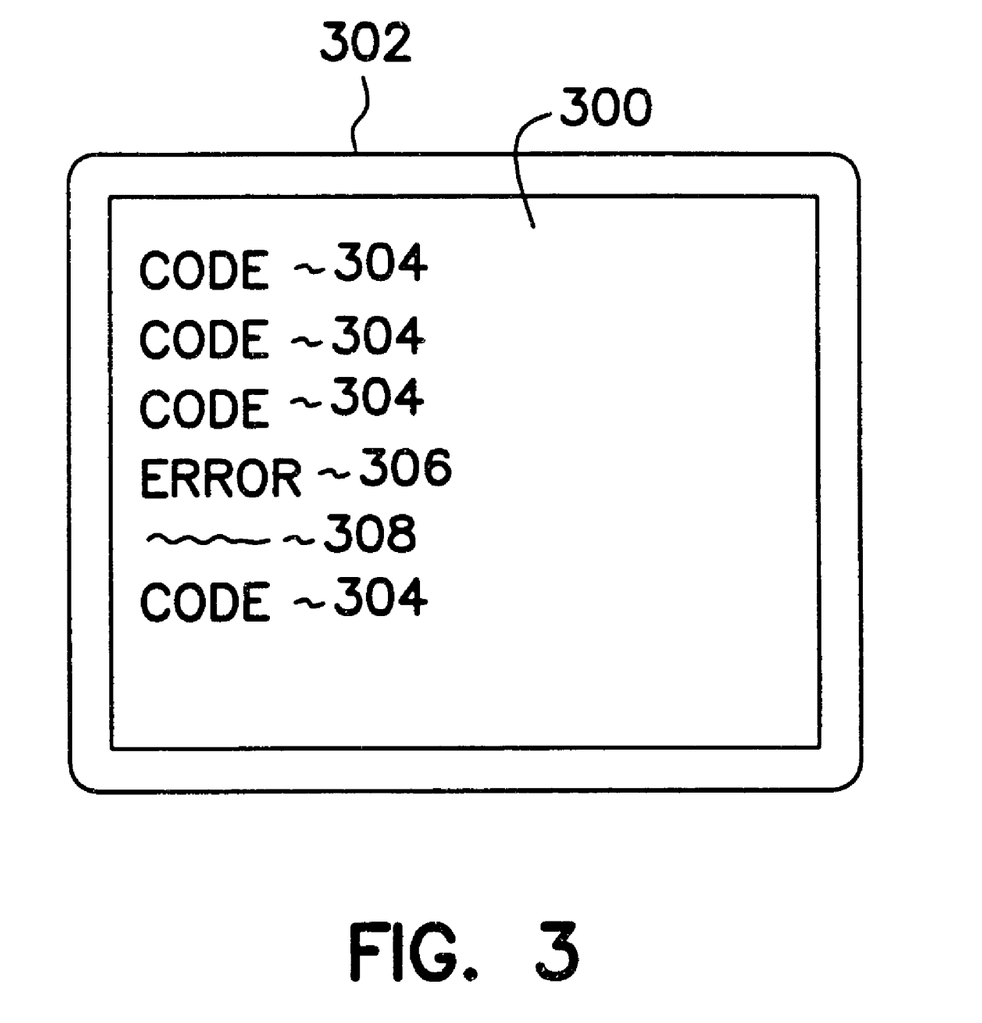
FIG. 3 shows a block diagram of a representative screen shot of an editor in which source code having errors is displayed, the errors being highlighted, according to one embodiment of the invention; and, FIG. 4 shows a flowchart illustrating a method according to one embodiment of the invention.

In one embodiment, the dynamic parser 204 parses the source code 206 for errors, indicating these errors to the editor 202, which then identifies the errors found by the parser 204 within the source code 206. In one embodiment, the editor 202 accomplishes this by underlining a corresponding section of the source code 206 in which the error or errors were found. This is shown in more detail in FIG. 3, a block diagram of a representative screen shot of an editor, according to one embodiment of the invention. Within screen 300 of display 302, several (correct) lines of code 304 are shown, along with one incorrect line of code 306. This error is indicated by a "squiggly" underline 308 within the editor.

Thus, in this manner, the invention provides for advantages not found within the prior art. As the source code is written (developed) by a computer programmer via the editor, the dynamic parser continuously (dynamically) checks the entered source code for errors. Unlike the prior art, the invention does not have to wait for the programmer to initiate building or compiling him or herself.

In one particular embodiment of the invention, dynamic parsing is accomplished in two stages. In a first stage, headers, source files, and class information are parsed. That is, function, classes, methods, properties, namespaces, declarations, definitions, macros, attributes and type definitions and other such information are parsed. The information on the functions may be limited to their return types and parameters; the body of the function may not be parsed. During the first stage, a No-Compile-Browse (NCB) database/file may also be built, as is described in more particularity in the copending, cofiled, and coassigned applications previously incorporated by reference.

Dynamic parsing in its various embodiments needs to be extremely fast. This is a very important required element that effects all design decisions. It needs to do its job without any user noticeable performance degradation in the IDE. Empirical evidence suggests that delays of over ½ second are noticeable. To achieve these many heuristics need to be used throughout the process and some of these are described in this document.

This first stage may be considered an NCB file/database population phase. That is, the first stage is the parsing of the source code to introduce new information into the NCB file/database. A traditional parser produces object modules, and no such modules are produced by the dynamic parser of the invention during the population phase. Such information is descriptive information—how various functions, classes, methods, attributes, typedefs, structs, declarations, macro declarations, #include, #import, references, global variables, namespaces, templates, etc., are defined, and where they are located. The above list is no means complete and the invention is not limited to entities mentioned above and this list should include all entities of interest in the programming language being used. Those skilled in the art of parsing will note that most of this information is already present in almost every parser. Adding any missing information to an existing parser should be a task of moderate complexity. No diagnostics in the user source are reported. This stage simply does the task of populating the NCB file/database. Traditional parsers expect input in form of files . . . they will need a slight modification to be able to read from a shared memory address (and this is again known in the art).

Many heuristics are used to get all the program information in a timely (i.e. speedy) manner. Here are some important ones that are incorporated in one embodiment of our invention (in what follows we talk in terms of files as entities that contain portions of programs because they are well understood . . . our invention works even if a computer program was in another form like a database . . . our invention is not limited to files):

1. An important heuristic used in one embodiment is to skip the body of any functions and procedures encountered. This would require simple modifications to the parser. This heuristic works because information local to a function or procedure does have affect the entire program, but, the function itself.
2. Another heuristics in one embodiment parsing each file separately. Any files included or imported are dealt with separately. This will probably not work correctly with traditional or static parsers for most languages because they require program entities to be declared before use. Most Static Parsers will need fairly complex modifications to be able to deal with this. The most important modification is the ability to deal with unknown entities and continue parsing. This heuristic works because each included file is compiled at one time or another and the NCB database/file will have contributions from all such included files.
3. Yet another heuristic is for the parser to start with a set of known declarations of entities that are commonly used. These declarations should be ones that are invariant and that usually means are present in system header files.
4. Usually a software development environment (i.e. an IDE) knows about all files that make up a program. When a new file is created or brought in from a library or another program user action is required to tell the IDE that is part of the program. This poses a special problem to dynamic parsing in the presence of heuristic 2. Above. Each file needs to be parsed separately. To overcome this a stage before Stage One can be added to determine all the files that a given file includes and inform the IDE to automatically add them to the program.

Static parsers are invoked only when the user initiates a build. They take a fairly substantial amount of time to do their job and so the user generally knowing invokes a build when they have finished writing a piece of code. They work very well with correct syntax and when they encounter program errors they can easily get by simple error recovery. Error recovery usually involves guessing the users intent after the error is located. Most suffer from cascading errors when the intent is miss-diagnosed. This has no bad consequences because at this point the user needs to correct the reported errors to continue. As a contrast Dynamic Parsers are invoked at indeterminate times and invoked very often (in one embodiment once every second). This means that Dynamic parsers very rarely get perfectly good code as input and as such Dynamic parsers cannot get by using simplistic error recovery techniques. Most traditional parsers will need extensive modifications (but well known, studied and documented techniques in the extensive literature known to those proficient in parsing techniques) so that they can continue parsing in the presence of errors and incomplete modifications to the program code. Heuristics like those mentioned above require further modifications in order to cope with missing entities that a static parser would normally have at its disposal. The error recovery needs to synchronize with correct code fragments after the error as soon as possible so that minimal incorrect information is populated in the NCB database/file. Unrecoverable errors should cause very minimal missing entries in the NCB database/file.

The NCB database/file is an external database including dynamic information from the source code being analyzed, and prebuilt information from libraries that the source code may utilize, such as the Microsoft Foundation Classes in one embodiment of the invention. The difference between the dynamic and pre-built information is that the latter is already built into the NCB database/file, since it is assumed that a programmer will be relying on one or more of the libraries when creating his or her own program, while the dynamic information is generated while the user is developing code. The dynamic parser 204 of FIG. 2 uses a database engine so that the NCB file can be added to, can be searched, etc. The invention is not limited to a particular type of database engines, and such engines are known within the art. In the second stage various actions can be performed that require dynamic parsing to various degrees. All of these actions make use of the NCB file/database which was populated in the first stage. These include identifying errors in the user code, completing user statements, completing entities used in the program, providing information on entities used in the program, etc. These are described in more particularity in the copending, cofiled, and coassigned applications previously incorporated by reference.

In a second stage, (in one embodiment), the body of the function is parsed, to identify syntax and potentially semantic errors and display them. That is, in the second stage, the NCB is queried to determine errors, etc. Such errors may include simple syntax errors, such as missing ";", "}", ")", ", " characters. Also, such errors may include identification of unknown and undeclared identifiers, as known within the art. Incorrect argument lists, such as "for (int i=0; i++)" (that is, which has a missing parameter) may also be identified. The invention is not, however, particularly limited to a given type of errors to be identified in this second stage of parsing.

In one particular embodiment, the parser generates warnings, stating that there is code that is technically proper, but may include inconsistencies that the user may wish to check for, and errors, stating that the indicated code is incorrect. Note that parsing is different than compiling, because only the information inside a given function is considered, as well as information from the NCB database/ file; thus, false positives may be generated. Furthermore, inasmuch as the NCB database/file query stage may be conducted out of order, errors and warnings that cannot be detected with this type of out-of-order compiling generally are not detected.

In other words, besides false positives being generated, some true negatives may be missed. That is, the NCB database/file query stage queries the NCB database/file based on the information that is displayed to the user on the screen, since this is the only information that can be seen by the user. Therefore, the NCB database/file query stage determines what functions are shown on the screen, and queries as to those functions. Thus, preceding (as well as succeeding) functions are not parsed. Therefore, the NCB database/file query stage may be considered as an "out of order" compiling. Some Errors that relate to earlier functions may not be caught. Other errors that require analysis of the program that consumes a lot of time or requires information that only a complete sequential compile (i.e. a static parse) cannot be detected. Some errors that are detected may not match what a static parse would see because of "out of order" compiling. Furthermore, some false positives may be generated. These false positives are undesirable and so every effort is made to eliminate or minimize these. The "out of order" compilation means that these can, in theory, never be completely eliminated.

In one embodiment of the invention, the dynamic parser is implemented as follows, as those of ordinary skill within the art will understand. The editor uses a file buffer for the contents of a file in memory. This buffer is maintained as line tables as known in the art. These tables are modified when a user types code. As the user types code and pauses, idle processing kicks in. During the idle cycles in the editor, the source code file that is currently active is added to a first stage parse queue. The file is added to the queue only when its current contents have never been parsed or if it has been modified since it was last parsed. To identify if the document has been modified since it was last parsed, a dirty bit is used. This dirty bit is set at every user key stroke to indicate that the file has been modified. It is reset at a later point of time, as explained later in this application. If the file already is in the queue, it is not added again. A secondary parser thread removes items from this queue when it gets cycles and invokes the first stage of parsing, as has been described (in one embodiment, this a includes updating a no-compile-browse (NCB) database or file (as used in one embodiment of the invention, the NCB is a database, but in other embodiments, may also be considered a file; as these two terms are used in this application, the term database is also meant to include an NCB that is a file, and the term file is also meant to include an NCB that is a database—that is, neither the term file or database is meant to be limiting), as described in more particularity in the copending, cofiled, and coassigned applications previously incorporated by reference).

When the (secondary) parser thread encounters an entry in the first stage queue it obtains the current contents of the source code file from the editor rather than the one stored on the hard disk drive. Since the parser (secondary thread) and the editor are in two different threads, and the editor line tables may not be thread-safe, as known within the art, the parser may not be able to directly access the editor's line table. Therefore, it posts a message to the primary (UI/ editor) thread, to copy the contents of the current editor's line table into a shared memory location. After it posts this message, it waits for an event (a signal) from the editor before proceeding further. The editor, on receipt of this message, copies the current contents to the specified memory location, resets the aforementioned dirty bit, and then fires the event. The parser thread, which was blocked on this particular event, wakes up, and hands over a pointer to the shared memory location to the compiler for parsing.

Once the first stage of the parsing is complete, the NCB database/file is updated, as has been described, and the parser thread generates a notification to so indicate. The second stage of parsing then begins as described in this applications to identify errors within the source code. Such errors are passed along to the editor, so that the editor may be able to identify them to the programmer on-screen.

The second stage action described here is error diagnosis. Other actions are described in copending, cofiled, and coassigned applications previously incorporated by reference. One possible second stage action that can be embodied is doing a dynamically traditional compile at idle time. This has not been described in detail in these applications.

The second stage differs from the first stage in that all code that is passed to the compiler is parsed. Errors are significant and reported. Like the first stage no object module is produced. Error recovery still needs to be fairly robust. Most static parser known in the art provide diagnostics that include specification of the line number of the location of an error. This is sufficient for a simplistic embodiment of our invention. This is not sufficient for an elegant embodiment of the invention and such static parsers will need fairly extensive modifications to provide the exact range of the code fragment in error. These modifications should be well understood by those proficient in the art. The second stage queries the NCB file/database for entities not known in the code fragment being compiled (quite extensively depending on the complexity of the user code). The NCB file/database is external to the compiler and as such the compilers symbol table is independent of database contents. pdating the compilers symbol table requires queries to the NCB file/database. Program entities are often very tightly interdependent and a simple query might require loading up of all of this information from the database (e.g. in C++ the entire class hierarchy). Many heuristics are required to minimize the database queries and avoid performance degradation. Other embodiments also include the following:

1. Heuristic to load information only when it is really needed. For example in C++, if the user code makes use of an entity that is a class then it is sufficient to know this fact (i.e. a forward declaration). If the user code makes use of a member of this class this is not sufficient and the class hierarchy might be needed because the member might be from the class hierarchy. It is still sufficient to get by with the names of all base classes and just the names of all methods in the hierarchy. It is not required to load up the complete declarations of the methods from the database and load up the complete declaration only if its is actually needed. To be able to do this the parser needs the ability to load and add partial definitions into a class on the fly at any time. This requires substantial modification to a traditional parser that those knowledgeable in the art should be able to do.

2. Heuristic to load macro definitions on the fly for programming languages that have macros. This is because in a complex program there is a very large set of macro definitions. Any identifier could be a macro and all macro expansion needs to happen before parsing. This usually means querying the NCB store (viz., database or file) and so loading macros into the compiler symbol table on the fly makes sense. Traditional parsers either have a separate pre-processing stage or incorporate the pre-processing and parsing stages in tandem. In either case they rarely have the ability to define macros at any instant of the compile and so will require a little work.

It is noted that the second stage of parsing does not necessarily directly follow the first stage of parsing. In one embodiment, the stages are performed asynchronously. The parsing for errors and warnings occurs when the source code file that is currently active is added to a second stage parse queue. The file is added to this queue in this embodiment when its current contents have never been parsed before, or if the following conditions are true: the file has been modified since it was last parsed for errors and warnings; the user moved to a different line; and, either the new line or the line where we moved from has an end of statement marker at the end of the line. (End of statement markers are semicolon (;) and close curly brace(}) in most languages including C++.)

The above heuristics are applied in this embodiment so that user does not get errors or warnings as he or she is midway typing the name of an identifier. A logical statement is waited for before second stage parsing occurs. At the end of the parsing, the compiler conveys all the errors and warnings to the editor where they are painted for the user to see. The second stage can also be invoked by a user action at any time. These actions include some like selecting an icon, selecting a menu entry or entering a hot key.

Method

In this section of the detailed description, a method according to an embodiment of the invention is presented.

Figure 4:
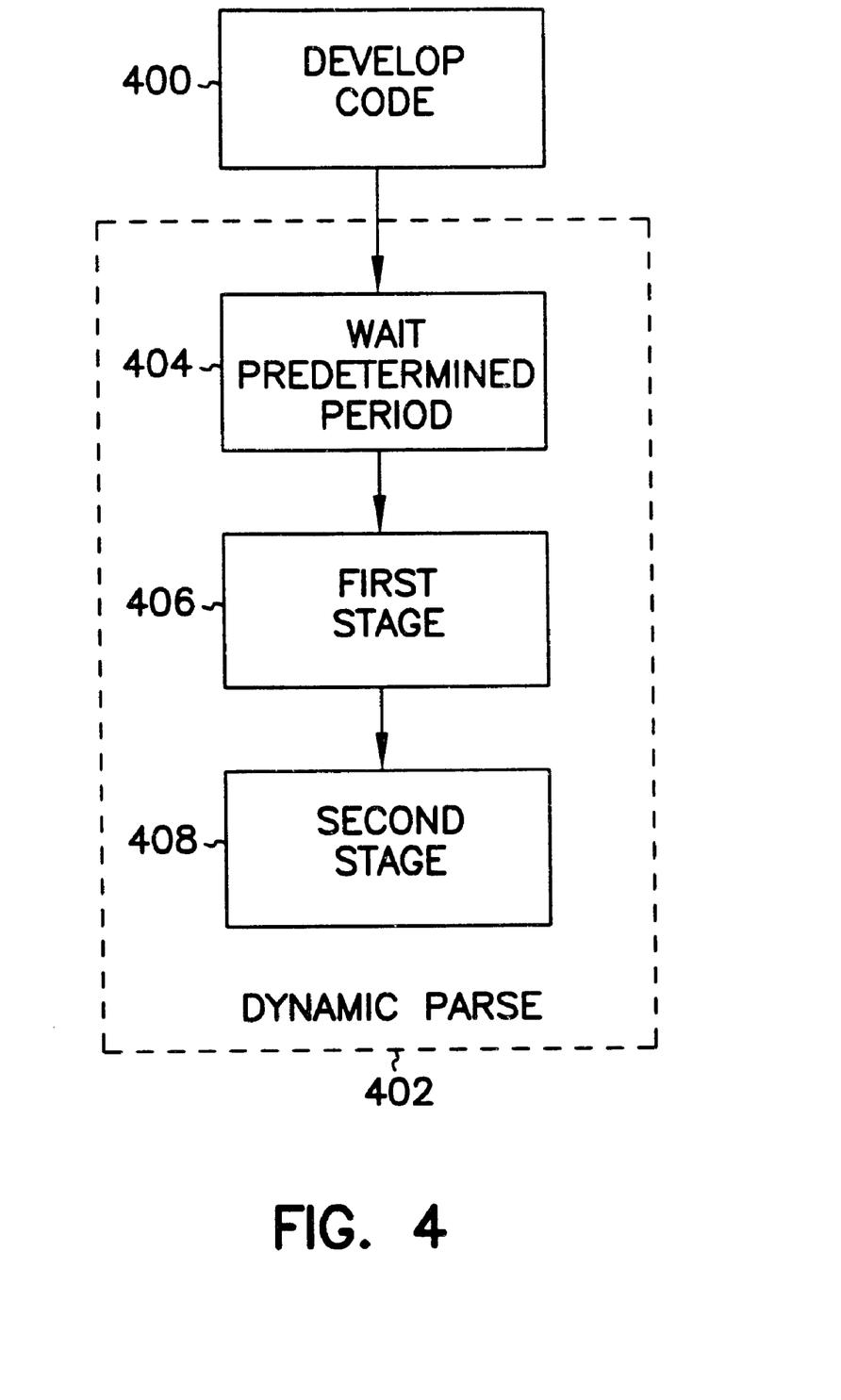

This description is provided in reference to FIG. 4. The computerized method is desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution and installation and execution on another (suitably equipped) computer. Thus, in one embodiment, a computer program is executed by a processor of a computer from a medium therefrom to parse source code as developed within an editor during predetermined times.

Referring now to FIG. 4, a flowchart of a method according to one embodiment of the invention is shown. In 400, at least a section of source code for a computer program is developed (written). Such source code may be written by a computer programmer using an editor. In 402, the source code written in 400 is dynamically parsed, during predetermined times. For example, the source code written in 400 may be parsed dynamically for errors, and such errors may be identified by the underlining of a corresponding section of the source code within the editor program.

In one embodiment, dynamic parsing in 402 is accomplished via 404, 406 and 408. In 404, prior to initiating parsing, a predetermined time-out period is waited for. For example, parsing may in one embodiment not begin until the programmer has stopped entering code into the editor for a half second or one second. In 406, a first stage of parsing is then accomplished. In one embodiment, this includes parsing the source code so that the class, function, and data information is culled (parsed) from headers and source files. This first stage of parsing may be accomplished as has been described in the previous section of the detailed description. Finally, in 408, in a second stage of parsing, the source code is then checked for errors, which may then be indicated in the editor. This second stage of parsing may also be accomplished as has been described in the previous section of the detailed description.

Conclusion

Dynamic parsing has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A sytem comprising:
   an editor to provide for developing source code for a computer program; and,
   a dynamic parser to parse the source code as the source code is developed using the editor during predetermined times, the dynamic parser comprising;
   a file to store pre-built information, and dynamic information regarding the source code; and, a database engine to provide for querying of the file.
2. The system of claim 1, wherein the dynamic parser parses the source code for errors.
3. The system of claim 2, wherein the editor identifies the errors found by the dynamic parser.
4. The system of claim 3, wherein the error identifies the errors by underlining a corresponding section of the source code.
5. The system of claim 1, wherein the predetermined times comprise predetermined time-out periods.
6. The system of claim 1, wherein the dynamic parser parses the source code in two stages.
7. The system of claim 6, wherein the two stages comprises a first stage in which headers and source files are parsed for class, function, and data information.
8. The system of claim 6, wherein the two stages comprises a first stage in which the file is generated.
9. The system of claim 6, wherein the two stages comprises a second stage in which errors are identified.
10. The system of claim 6, wherein the second stage is invoked upon occurrence of a predetermined event.
11. The system of claim 10, wherein the predetermined event is selected from a group consisting of: entering a hot key, selecting an icon or selecting a menu entry, or, the user moved to a different line and a end of statement marker is found on either line.
12. The system of claim 6, wherein the two stages comprises a second stage in which the file is queried.
13. A method comprising:
    developing at least a section of source code for a computer program; and,
    parsing dynamically the at least a section of source code, as the at least a section of source code is developed, during predetermined times, the parsing comprising:
    generating a file including prebuilt information, and dynamic information relating to the source code; and querying the file.
14. The method of claim 13, wherein parsing dynamically comprises applying at least one heuristic.
15. The method of claim 14, wherein the at least one heuristic includes skipping a body of each of any functions and procedures of the source code.
16. The method of claim 14, wherein the at least one heuristic includes parsing each of a plurality of source files making up the source code separately.
17. The method of claim 14, wherein the at least one heuristic includes starting wit h a set of known declarations of entities.
18. The method of claim 14, wherein the at least one heuristic includes determining all other files that a given file including the source code includes.
19. The method of claim 13, wherein developing the at least a section of source code comprises utilizing an editor program.
20. The method of claim 13, wherein parsing dynamically comprises parsing the at least a section of source code for errors.
21. The method of claim 13, further comprising identifying the errors found.
22. The method of claim 21, wherein identifying the errors found comprises underlining a corresponding section of the at least a section of source code in the editor.
23. The method of claim 13, wherein parsing dynamically comprises initially waiting for a predetermined time-out period.
24. The method of claim 13, wherein parsing dynamically comprises parsing the at least a section of source code in a first stage in which headers and source files are parsed for classes, functions, and data.
25. The method of claim 13, wherein parsing dynamically comprises parsing the at least a section of source code in a second stage in which errors are parsed.
26. A computer comprising:
    a processor;
    a computer-readable medium; and, a dynamic parsing program to parse source code as developed within an editor during predetermined times, the program comprising:
- a first stage to generate a file including pre-built information, and information relating to the source code; and,
- a second stage to query the file.

27. The computer of claim 26, wherein the dynamic parsing program parses the source code for errors.

28. The computer of claim 26, wherein the predetermined times comprise predetermined time-out periods.

29. A computer-readable medium having a dynamic parsing program stored thereon for execution on a computer, the program to parse source code as developed within an editor during predetermined times, and comprising:
- a first stage to generate a file including pre-built information, and information relating to the source code; and,
- a second stage to query the file.

30. The medium of claim 29, wherein the dynamic parsing program parses the source code for errors.

31. The medium of claim 29, wherein the predetermined times comprise predetermined time-out periods.

* * * * *